Figure 1:
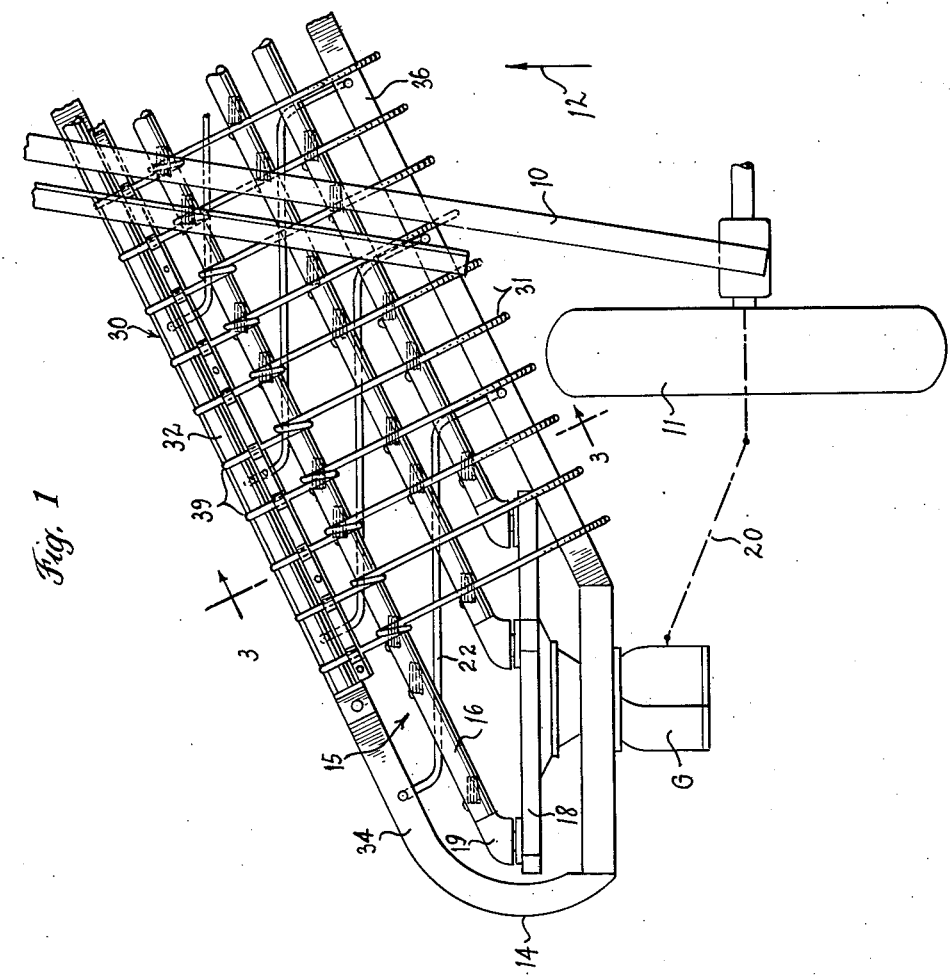

May 29, 1962  H. G. McCARTY ET AL  3,036,420
SIDE DELIVERY RAKE

Filed Aug. 17, 1960  2 Sheets-Sheet 1

INVENTORS
John K. Hale &
Horace G. McCarty
Joseph Allen Brown
ATTORNEY

May 29, 1962  H. G. McCARTY ET AL  3,036,420
SIDE DELIVERY RAKE
Filed Aug. 17, 1960  2 Sheets-Sheet 2
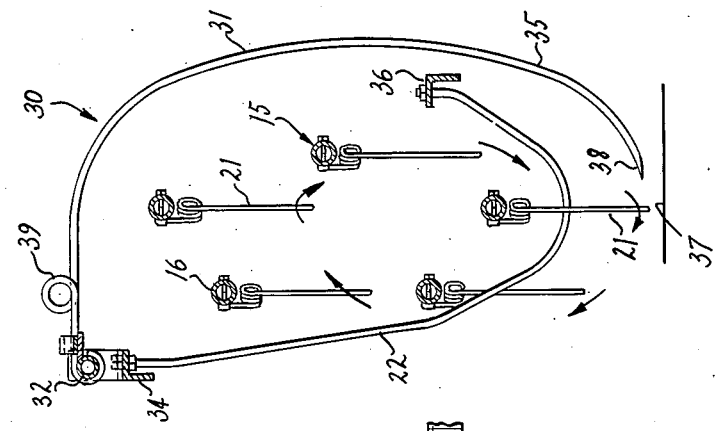
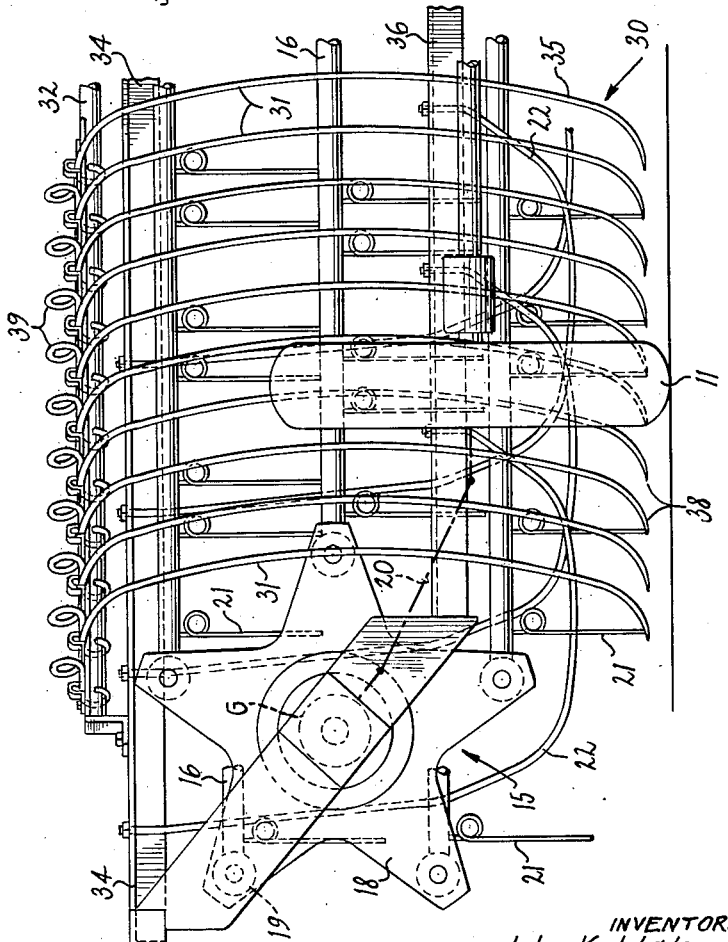
INVENTORS
John K. Hale &
Horace G. McCarty
Joseph Allen Brown
ATTORNEY

United States Patent Office 3,036,420
Patented May 29, 1962

3,036,420
SIDE DELIVERY RAKE
Horace G. McCarty and John K. Hale, New Holland, Pa.,
assignors to Sperry Rand Corporation, New Holland,
Pa., a corporation of Delaware
Filed Aug. 17, 1960, Ser. No. 50,168
3 Claims. (Cl. 56—377)

This invention relates to side delivery hay rakes and more particularly to a sparse material attachment for a reel type side delivery rake.

A rake of the type involved in this invention is shown in U.S. Patent No. 2,781,626, issued February 19, 1957. Such rake has a pair of laterally spaced spiders rotatable about parallel axes. Five rake bars extend between and are connected to the spiders. Power to rotate the reel is derived from ground travel, there being a suitable power train connected from the ground wheels to one of the reel spiders. The fingers on the rake bars of the raking reel, sweep downwardly and forwardly and upwardly as they travel on each raking stroke. Stripper members are provided which strip hay from the fingers.

To provide operating clearance with the stripper members, the rake fingers on the reel bars must be laterally spaced relative to each other. The raking fingers are close enough together that all of the hay resting on the ground will be efficiently and effectively raked regardless of whether the quantity of hay is light or heavy. However, if the hay is extremely sparse, for example in a drought area or in some very arid areas of the United States, the spacing between the reel fingers might result in some of the hay to be raked being missed. In areas or conditions where every last bit of hay is important to the farmer, such hay loss is undesirable.

One object of this invention is to provide a sparse material attachment for a rolabar hay rake, such attachment being operative to catch any hay which the rake reel may miss.

Another object of this invention is to provide a sparse material attachment for a rolabar hay rake, the attachment being so designed and related to the raking reel that hay picked up by the attachment is merged with hay raked by the reel and then delivered to the side by the reel.

Another object of this invention is to provide a sparse material attachment of the character described which has substantially more raking fingers than the number of raking fingers on any one rake bar of the reel, the sparse attachment fingers being disposed closely together so that no hay will pass between them.

A further object of this invention is to provide a sparse material attachment of the character described having raking fingers, each of which has a free end disposed closely adjacent to the point where the rake fingers on the reel come closest to the ground whereby the fingers on the sparse attachment deliver hay to the raking reel so that the fingers on the reel will pick off such hay and rake it to the side.

A still further object of this invention is to provide a sparse material attachment of the character described which can be added to side delivery rakes presently in use and which is relatively inexpensive and easy to repair.

Other objects of this invention will be apparent hereinafter from the specification and from the recital in the appended claims.

In the drawings:
FIG. 1 is a fragmentary plan view of one end of a side delivery hay rake having a sparse material attachment mounted thereon constructed according to this invention;
FIG. 2 is a rear elevational view of the rake shown in FIG. 1; and
FIG. 3 is a somewhat diagrammatic section taken on the line 3—3 of FIG. 1 looking in the direction of the arrows and showing the relationship of the attachment to the raking reel.

The side delivery rake shown in the drawings is similar to that shown in U.S. Patent No. 2,781,626, previously referred to. It comprises a frame 10 supported on ground wheels one of which is shown at 11. The frame is adapted for ground travel forwardly as indicated by the arrow 12 in FIG. 1. Mounted on frame 10 and extending diagonally relative to the direction of travel of the frame is a basket structure 14 which rotatably supports a raking reel 15. Such reel comprises diagonally extending rake bars 16 which extend parallel to each other and are angularly spaced about the axis of rotation of the reel 15. The bars 16 are supported at their ends on rake spiders one of which is shown at 18. Suitable bearings are provided at 19 at the ends of each rake bar to provide pivotal connections with the supporting spiders. The spider 18 is rotated by power derived from a gearbox G having a power input from the ground wheel 11 through power connection means diagrammatically illustrated at 20. The power connection means is conventional and may be similar to that shown in U.S. Patent No. 2,929,192, issued March 22, 1960. When viewed as shown in FIG. 2, spider 18 rotates in a clockwise direction whereby the rake bars 16 move downwardly, then forwardly, then upwardly relative to the direction of travel of the rake frame.

Each of the bars 16 has fastened thereto a plurality of rake fingers 21. These rake fingers are mounted in pairs and each pair is laterally spaced from the adjacent pairs. Stripper members or rods 22 are carried on the basket 14 and so located that the raking fingers on the reel pass downwardly relative to the sripper members to rake the hay and then are extracted upwardly whereby the stripper members remove the hay from the rake fingers. When viewed as shown in FIG. 1, hay raked by the reel 15 is conveyed toward the left. The above structure is conventional and substantially the same as that shown in Patent No. 2,781,626.

As can be viewed from FIGS. 1 and 2, the sets of raking fingers on the reel are laterally spaced relative to each other to provide clearance with stripper members 22. As a result, when very sparse material is raked, some slight amount of material may escape and pass between the rake fingers. To catch any hay which the reel might miss, a sparse material attachment 30 is provided. Such attachment comprises a group of stationary rake fingers 31 which are carried on a diagonally extending support pipe 32 connected to bracket member 34 of the basket 14. As shown in FIG. 3, the rake fingers extend rearwardly from the pipe 32 and then downwardly behind the raking reel 15. The lower portions 35 of the stationary rake fingers 31 extend behind the angle bracket 36 of basket 14 and then downwardly and forwardly. The fingers 21 on the raking reel come closest to the ground at a point indicated at 37, FIG. 3. It will be noted that the free end 38 of each finger 31 is located closely adjacent to the lowermost point where the reel reaches the ground. It will also be noted that each stationary rake finger includes a coil spring element 39 whereby the finger may yield rearwardly relative to the forward direction of travel of the rake if an obstruction is encountered.

The number of stationary rake fingers 31 is substantially greater than the number of raking fingers 21 on any one reel bar 16. The rake fingers are uniformly laterally spaced and are positioned close together. Attachment 30 extends parallel to the diagonal extension of the reel 15. Likewise, in overall diagonal extent, it is substantially the same length as the raking reel.

In operation, raking reel 15 performs the main raking function. Hay engaged by the fingers 21 is conveyed toward the left of FIG. 1 and discharged off of the trailing end of the rake. Any hay which escapes between the raking fingers is caught by the stationary rake fingers 31 of the sparse material attachment. The hay gathered by the fingers 31 builds up and because of the curvature of the fingers is deflected forwardly as the rake moves along the ground. As the fingers 21 sweep downwardly on a raking stroke, they sweep over the free ends 38 of the stationary rake fingers and remove hay therefrom. Such hay is combined with the hay being raked by the reel and delivered to one side of the rake.

It has been found that in operation, a certain amount of hay becomes engaged on the rake fingers 31 of the sparse material attachment and builds up thereon which is a desirable feature. Hay caught by the fingers 31 operates to catch other hay which passes through rake fingers 21 without being raked. When the amount of hay on the sparse material attachment builds up to a certain point, the fingers 21 on the reel pick it off.

It will thus be seen that the sparse material attachment is mounted in a particular specific relationship with the raking reel and is cooperative therewith to insure an absolutely clean raking operation. In essence, the sparse material attachment operates to catch any hay which the reel misses and then to deliver such hay forwardly so that the reel can pick it up and convey it laterally. Such attachment provides a highly useful addition to side delivery rakes for certain arid areas of the United States.

While this invention has been described in connection with a particular embodiment thereof, it will be understood that it is capable of modification and this application is intended to cover any variations, uses, or adaptations following, in general, the principles of the invention and including such departures from the present disclosure as come within known or customary practice in the art to which the invention pertains and as fall within the scope of the invention or the limits of the appended claims.

Having thus described our invention, what we claim is:

1. A side delivery hay rake comprising a wheel supported frame adapted for ground travel in a forward direction, a rotatable raking reel mounted on said frame and extending diagonally relative to the travel of said frame, said raking reel comprising spider means rotatable about an axis parallel to said forward ground travel, a plurality of angularly spaced rake bars on said spider means disposed about the axis of the reel and on which a plurality of rake fingers are mounted, drive means connected to said spider means to rotate the reel in such direction that the fingers on each bar move downwardly and forwardly to a point close to the ground and then upwardly on each raking stroke, rods on said frame in crop stripping relation to said fingers, and a sparse material attachment mounted on said frame and having a group of stationary rake fingers which extend behind said reel and as a group are arranged generally parallel to said diagonal extension of the reel, said stationary rake fingers having lower free ends located adjacent the ground and in close proximity to the path of travel of said reel fingers whereby the reel fingers pick off hay gathered by said stationary fingers and combine it with the hay raked by said reel, the length of said attachment being substantially the same as the length of said reel.

2. A side delivery hay rake comprising a wheel supported frame adapted for ground travel in a forward direction, a rotatable raking reel mounted on said frame and extending diagonally relative to the travel of said frame, said raking reel comprising spider means rotatable about an axis parallel to said forward ground travel, a plurality of angularly spaced rake bars on said spider means disposed about the axis of the reel and on which a plurality of rake fingers are mounted, drive means connected to said spider means to rotate the reel in such direction that the fingers on each bar move downwardly and forwardly to a point close to the ground and then upwardly on each raking stroke, rods on said frame in crop stripping relation to said fingers, and a sparse material attachment mounted on said frame and having a group of stationary rake fingers which are located behind said reel and as a group extend parallel to said diagonal extension of the reel, said stationary rake fingers having lower ends located adjacent the ground and in close proximity to the path of travel of said reel fingers whereby the reel fingers pick off hay gathered by said stationary fingers and combine it with the hay raked by said reel, the stationary fingers in said group being mounted closer together and being greater in number than the number of reel fingers on any given rake bar, and the length of said attachment being substantially the same as the length of said reel.

3. A side delivery rake as recited in claim 2 wherein said stationary rake fingers have portions which extend downwardly and forwardly, and each stationary finger is yieldable rearwardly.

References Cited in the file of this patent
UNITED STATES PATENTS

| | | |
|---|---|---|
| 410,608 | Rew | Sept. 10, 1889 |
| 752,585 | Paulson | Feb. 16, 1904 |
| 1,251,373 | Holeman | Dec. 25, 1917 |
| 1,281,133 | Cheesebro | Oct. 8, 1918 |
| 2,621,466 | Kopp | Dec. 16, 1952 |